United States Patent [19]

Gomes et al.

[11] 4,167,555

[45] Sep. 11, 1979

[54] EXTRACTION OF TUNGSTEN FROM ORES

[75] Inventors: John M. Gomes; Daniel A. O'Keefe, both of Reno; Andrea E. Raddatz, Sparks, all of Nev.

[73] Assignee: The United States of America as represented by the Secretary of the Interior, Washington, D.C.

[21] Appl. No.: 969,768

[22] Filed: Dec. 15, 1978

Related U.S. Application Data

[63] Continuation-in-part of Ser. No. 912,264, Jun. 5, 1978, abandoned.

[51] Int. Cl.$^2$ .............................................. C01G 41/00
[52] U.S. Cl. ........................................ 423/53; 423/61; 75/101 R; 75/103
[58] Field of Search ................. 423/53, 61; 75/101 R, 75/103

[56] References Cited

U.S. PATENT DOCUMENTS

| | | | |
|---|---|---|---|
| 1,431,559 | 10/1922 | Becket | 423/61 |
| 2,351,678 | 6/1944 | Hall | 423/57 |
| 3,800,025 | 3/1974 | Fox | 423/61 |

FOREIGN PATENT DOCUMENTS 189873  12/1922  United Kingdom ...................... 423/61

*Primary Examiner*—Herbert T. Carter
*Attorney, Agent, or Firm*—William S. Brown; Donald A. Gardiner

[57] ABSTRACT

Tungsten is extracted from hot springs tungsten ores by means of a process comprising (1) calcining the ore, (2) quenching the calcined ore in aqueous alkaline solution and (3) treating the resulting slurry at elevated temperature and pressure to extract the tungsten values from the ore.

2 Claims, No Drawings

EXTRACTION OF TUNGSTEN FROM ORES

This application is a continuation-in-part of application Ser. No. 912,264, filed June 5, 1978 and now abandoned.

This invention relates to an improved method for extraction of tungsten from hot springs tungsten ores. These ores are unique as to both occurrence and form, with the occurrence being limited to blanket-like deposits and veins underlying beds of calcareous tufa. They generally contain from about 1 to 7 weight percent $WO_3$, with the tungsten being finely disseminated, and generally colloidally dispersed, throughout iron oxide and manganese oxide minerals in the ore. Furthermore, the tungsten in such ores is not present in the form of any known mineral species such as the $CaWO_4$ and $(Fe,Mn)WO_4$ of the conventional scheelite and wolframite ores, respectively. Typical of such ores are the deposits at Golconda, Nevada, which are described in "Tungsten-Bearing Manganese Deposit at Golconda, Nevada" by Paul F. Kerr, Bulletin of the Geological Society of America, Volume 51, page 1359.

The tungsten values in the hot springs tungsten ores are not soluble in conventional alkali solvents such as alkali metal carbonate, hydroxide or sulfate. In addition, their recovery is not substantially facilitated by conventional preliminary treatments such as roasting of the ore alone or in combination with salts such as $Na_2CO_3$, NaCl, $NaNO_3$ or $Na_3PO_4$. Accordingly, an improved procedure for efficient and economical extraction of tungsten from such ores is needed.

It has now been found, according to the process of the invention, that such an improved procedure is provided by a process comprising the steps of (1) calcining of the ore in an oxidizing atmosphere, (2) rapidly quenching the calcined ore in an aqueous solution of an inorganic alkali metal or ammonium salt, or mixtures of such salts, and (3) treating the resulting slurry at elevated temperature and pressure for a time sufficient to extract the tungsten values into the aqueous solution. As shown by the examples below, this procedure, utilizing rapid quenching of the calcined ore, results in substantially higher extraction than that obtained by prior art procedures, specifically leaching of slow-cooled ore. This is believed to result from a change in the crystal structure of the ore, caused by the calcination and rapid quenching, whereby the solubility of the $WO_3$ in aqueous alkaline solution is increased.

As the first essential step in the process, a particulated hot springs ore is calcined in an oxidizing atmosphere. Suitable particle size of the ore will generally be minus 8-mesh. Suitable calcination temperatures will generally be in the range of about 800° to 950° C., with optimum temperature depending on the specific composition and particle size of the ore, duration of calcination, and composition of the solution subsequently employed for quenching and extraction. The calcination is carried out for a period of about 1 to 3 hours, preferably about 2 hours. An oxidizing atmosphere, preferably air, is present during calcination.

The second essential step in the process of the invention involves rapid quenching of the hot calcined ore in an aqueous solution of an inorganic alkali metal or ammonium salt. This step is suitably carried out by immediately pouring the hot calcined ore into the aqueous solution, the latter being at approximately room temperature and pressure. Preferably, the quenching solution is rapidly agitated by conventional means during the quenching step. The volume of the quenching solution should be sufficient to provide rapid cooling of the calcined ore, with resulting change in the crystal structure of the ore and increased solubility of the $WO_3$ in the aqueous alkaline solution. Generally, the weight of quenching solution is suitably about 2 to 4 times that of the calcined ore. Total time required for the quenching step to provide the desired increase in $WO_3$ solubility will be from about 1 to 5 minutes.

The inorganic alkali metal or ammonium salt included in the quenching solution may be any salt, or mixture of salts, capable of forming soluble tungsten compounds with the tungsten in the ore during the subsequent extraction step. Suitable salts include carbonates, hydroxides, acetates, sulfates, borates and phosphates of ammonia or any of the alkali metals. A mixture of NaOH and $Na_2CO_3$, in approximately equal amounts on a weight percent basis, has been found to be particularly effective in the process of the invention. The amount and concentration of the alkali metal or ammonium salt in the quenching solution will be that sufficient to provide maximum extraction of tungsten in the subsequent extraction step. Accordingly, optimum amounts and concentrations will depend on the specific composition of the ore, particularly the amount of tungsten in the ore, the particular salts employed, and the specific process conditions employed in the calcination, quenching and leaching steps. Generally, however, suitable amounts of the salts will range from about 3 to 5 pounds per pound of $WO_3$ in the ore, with suitable concentrations of the salt in the solution being about 0.5 to 3 weight percent.

The third essential step in the process of the invention consist of treatment of the slurry resulting from the quenching step at elevated temperatue and pressure, and preferably with agitation, to extract a major portion of the tungsten from the ore. Again, optimum values of the processing conditions, i.e., temperature and pressure, will vary with the above-discussed variables. However, a temperature of about 180° to 300° C. and pressure of about 200 to 500 psi are generally suitable. Generally, a time of about 1 to 3 hours is sufficient to effect maximum extraction of tungsten from the ore, with the longer periods generally being required when the lower values of temperature and pressure are employed. Suitable equipment for this step of the process is that conventionally employed for caustic digestion, e.g., mild steel or stainless steel autoclaves.

The mixture resulting from the third step of the process of the invention may be treated by conventional means to separate the tungsten-containing extract from the residue by allowing the mixture to cool, filtering and washing the residue with water. The filtrate and wash solution are combined, and the tungsten is recovered from the combined solutions as ammonium paratungstate using conventional solvent extraction techniques. For example, the combined solutions may be extracted with an organic solvent containing an amine extractant. The resulting organic phase is then extracted with an aqueous solution of ammonium hydroxide, with ammonium paratungstate being recovered from the aqueous phase by crystallization.

The process of the invention will be more specifically illustrated by the following examples. Analyses, in weight percent, and sieve size distributions of Golconda hot springs ores used in the examples are given in Tables 1 and 2, respectively.

TABLE 1

| Ore No. | $WO_3$ | CaO | $Fe_2O_3$ | MnO | $Al_2O_3$ | $SiO_2$ |
|---|---|---|---|---|---|---|
| 1 | 1.63 | 20 | 29 | 4 | 9 | 19 |
| 2 | .78 | 11 | 26 | 2 | 11 | 32 |
| 3 | 4.30 | 17 | 2 | 34 | 3 | 7 |

TABLE 2

| Mesh | Ore No. 1 | Ore No. 2 | Ore No. 3 |
|---|---|---|---|
| +65 | 2 | 9 | 5 |
| −65+100 | 13 | 30 | 26 |
| −100+200 | 11 | 16 | 18 |
| −200+325 | 9 | 7 | 10 |
| −325 | 65 | 38 | 41 |

EXAMPLE 1

Two hundred grams of Ore Number 1, having the analysis set forth in Table 1 and the sieve size distribution set forth in Table 2, was calcined in a furnace at 900° C. for 2 hours in air. The hot ore was removed from the furnace and immediately poured into 600 ml of a rapidly agitated aqueous solution containing 15 grams (2.5 weight-percent) NaOH and 15 grams (2.5 weight-percent) $Na_2CO_3$. The agitation was continued for several minutes and the mixture was then transferred to an autoclave for extraction. The extraction step was carried out at 200° C. at a pressure of 300 psi for two hours, during which time the mixture was stirred. The mixture was allowed to cool and then filtered, and the residue was washed with water. Table 3 sets forth the volume of the filtrate (pregnant solution) obtained and the volume of the wash solution. It was determined that 95% of the $WO_3$ was extracted from the ore, as may be seen from Table 3.

EXAMPLE 2

In this example, Ore Number 2, having the analysis and sieve size distribution set forth in Tables 1 and 2, was processed using the procedure set forth in Example 1. As seen from Table 3, 84% of the $WO_3$ was extracted from this ore.

EXAMPLE 3

In this example, Ore Number 3, having the analysis and sieve size distribution set forth in Tables 1 and 2, was processed using the procedure set forth in Example 1. As seen from Table 3, 88% of the $WO_3$ was extracted from this ore.

TABLE 3

| | Wt, g | Vol, ml | $WO_3$ analyses Wt-pct | $WO_3$ analyses g/l | $WO_3$ distribution |
|---|---|---|---|---|---|
| #1 Ore | 200 | | 1.63 | | |
| Preg. soln. | | 550 | | 4.28 | 73 |
| Wash soln. | | 385 | | 1.89 | 22 |
| Residue | 170 | | 0.10 | | 5 |
| #2 Ore | 200 | | 0.77 | | |
| Preg. soln. | | 620 | | 1.75 | 71 |
| Wash soln. | | 500 | | 0.40 | 13 |
| Residue | 180 | | 0.13 | | 16 |
| #3 Ore | 200 | | 4.30 | | |
| Preg. soln. | | 600 | | 9.70 | 67 |
| Wash soln. | | 520 | | 3.34 | 21 |
| Residue | 178 | | 0.58 | | 12 |

We claim:
1. A process for extraction of tungsten from hot springs tungsten ores comprising:
 (a) calcining the ore in an oxidizing atmosphere at a temperature of about 800° to 950° C.,
 (b) rapidly quenching the calcined ore in an aqueous solution of an inorganic alkali metal or ammonium compound selected from the group consisting of carbonates, hydroxides, acetates, sulfates, borates, phosphates and mixtures thereof, at essentially ambient conditions of temperature and pressure, and
 (c) treating the resulting slurry at a temperature of about 180° to 300° C. and a pressure of about 200 to 500 psi for a time sufficient to extract a major proportion of tungsten from the ore.
2. The process of claim 1 in which the calcined ore is quenched in an aqueous solution of $Na_2CO_3$ and NaOH.

* * * * *